United States Patent
Yoshiya

(10) Patent No.: US 12,493,508 B2
(45) Date of Patent: Dec. 9, 2025

(54) INFORMATION PROCESSING APPARATUS AND METHOD

(71) Applicant: Kioxia Corporation, Tokyo (JP)

(72) Inventor: Fumio Yoshiya, Tokyo (JP)

(73) Assignee: Kioxia Corporation, Tokyo (JP)

( * ) Notice: Subject to any disclaimer, the term of this patent is extended or adjusted under 35 U.S.C. 154(b) by 7 days.

(21) Appl. No.: 18/742,735

(22) Filed: Jun. 13, 2024

(65) Prior Publication Data

US 2024/0419528 A1    Dec. 19, 2024

(30) Foreign Application Priority Data

Jun. 16, 2023    (JP) .................................. 2023-099271

(51) Int. Cl.
G06F 11/07    (2006.01)

(52) U.S. Cl.
CPC ...... *G06F 11/0769* (2013.01); *G06F 11/0727* (2013.01); *G06F 11/0745* (2013.01)

(58) Field of Classification Search
CPC ............. G06F 11/0727; G06F 11/0745; G06F 11/0751; G06F 11/0769; G06F 11/0772
See application file for complete search history.

(56) References Cited

U.S. PATENT DOCUMENTS

| | | |
|---|---|---|
| 2005/0177760 A1 | 8/2005 | Oohira |
| 2007/0168584 A1 | 7/2007 | Kamimura et al. |
| 2014/0122765 A1 | 5/2014 | Subramaniyan et al. |
| 2015/0012785 A1* | 1/2015 | Gurgi .................. G06F 11/073 714/799 |

FOREIGN PATENT DOCUMENTS

| | | |
|---|---|---|
| JP | 2005-215809 A | 8/2005 |
| JP | 2007-188428 A | 7/2007 |
| JP | 2014-099847 A | 5/2014 |

* cited by examiner

*Primary Examiner* — Michael Maskulinski
(74) *Attorney, Agent, or Firm* — Kim & Stewart LLP

(57) ABSTRACT

An information processing apparatus includes a processor, an interface circuit connectable to a device external to the information processing apparatus, a memory accessible by the processor and accessible by the device via the interface circuit; and a signal processing circuit. The signal processing circuit is disposed in a signal path between the interface circuit and the memory and configured to detect output of data read from the memory even when the interface circuit receives a read request from the device and causes the memory to perform a read operation in response to the read request, and generate an error notification when the memory notifies the signal processing circuit of normal output of the data. The interface circuit is configured to return, to the device, an error response corresponding to the error notification in response to the read request.

20 Claims, 4 Drawing Sheets

INFORMATION PROCESSING APPARATUS AND METHOD

CROSS-REFERENCE TO RELATED APPLICATION(S)

This application is based upon and claims the benefit of priority from Japanese Patent Application No. 2023-099271, filed Jun. 16, 2023, the entire contents of which are incorporated herein by reference.

FIELD

Embodiments described herein relate generally to an information processing apparatus and a method.

BACKGROUND

In the related art, Non-Volatile Memory Express (NVMe®) has been known as a standard of a communication protocol between an information processing apparatus and a device such as a flash memory. In this standard protocol, the device can access a certain area in a system memory provided in the information processing apparatus.

In addition, the information processing apparatus to which the device is connected includes an interface circuit that performs protocol conversion in order to enable use of the communication protocol between the information processing apparatus and the device.

DETAILED DESCRIPTION

Embodiments provide an information processing apparatus and a method capable of suitably performing operation verification of a device.

In general, according to an embodiment, an information processing apparatus includes a processor, an interface circuit connectable to a device external to the information processing apparatus, a memory accessible by the processor and accessible by the device via the interface circuit; and a signal processing circuit. The signal processing circuit is configured to detect output of data read from the memory when the interface circuit receives a read request from the device and causes the memory to perform a read operation in response to the read request, and generate an error notification even when the memory notifies the signal processing circuit of normal output of the data. The interface circuit is configured to return, to the device, an error response corresponding to the error notification in response to the read request.

Hereinafter, the information processing apparatus and a method according to the embodiments will be described in detail with reference to the accompanying drawings. The present disclosure is not limited by the embodiments.

Embodiment

Figure 1:
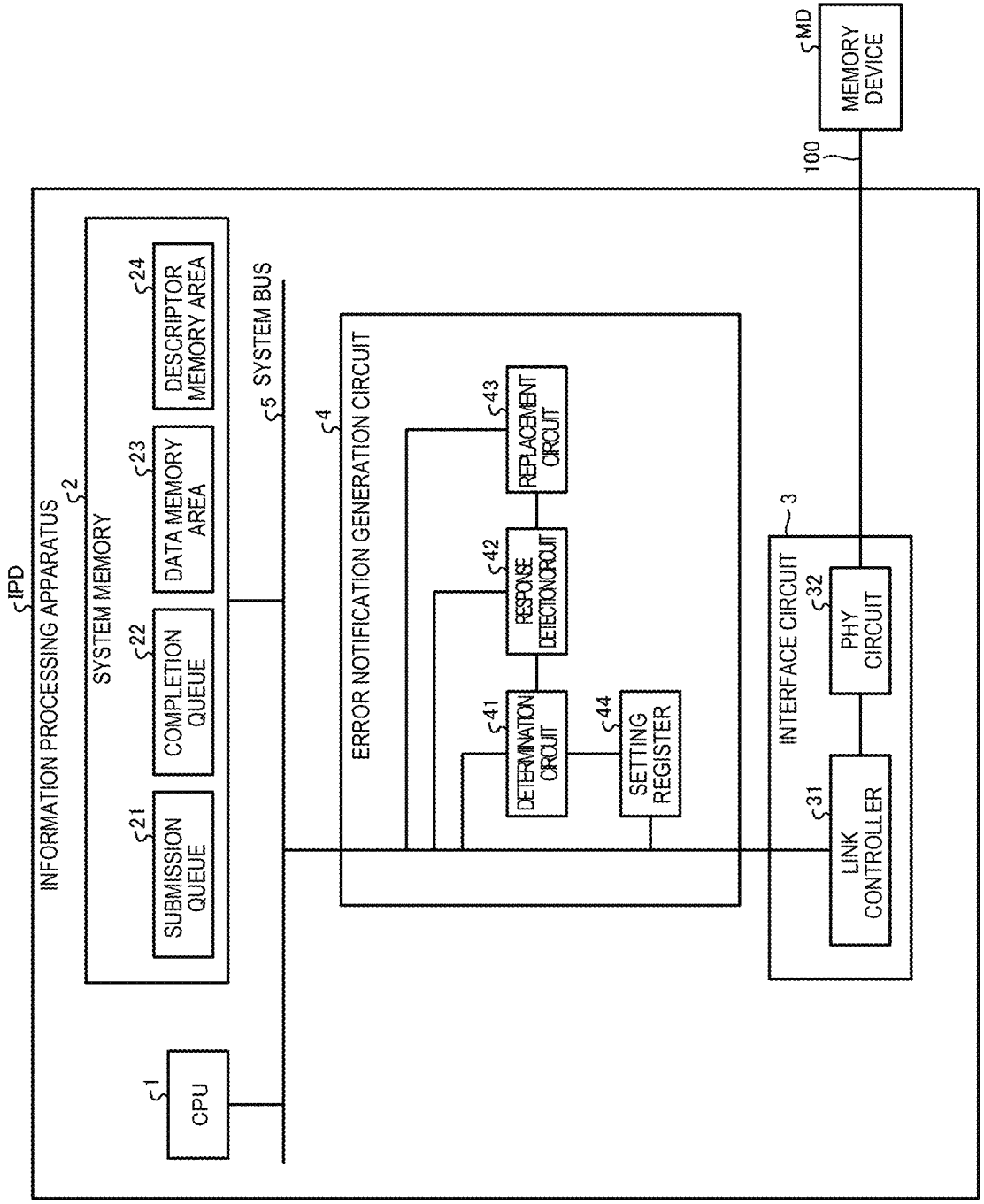
FIG. 1 is a diagram showing an example of a configuration of an information processing apparatus according to an embodiment.

FIG. 1 is a diagram showing an example of a configuration of an information processing apparatus according to an embodiment.

An information processing apparatus IPD is configured to be connected to a device through a communication path 100. In the example shown in FIG. 1, as an example of the device, a memory device MD is connected to the information processing apparatus IPD.

A connection standard to which the communication path 100 conforms is freely selected as long as it is a connection standard in which the device is allowed to access a system memory provided in a host. In the example, the communication path 100 conforms to a peripheral components interconnect (PCI) Express®.

A protocol standard of the communication via the communication path 100 is freely selected as long as it is a standard in which the device is allowed to access the system memory provided in the host. In the example, the information processing apparatus IPD and the memory device MD perform communication conforming to non-volatile memory express (NVMe®).

In the communication via the communication path 100, the information processing apparatus IPD corresponds to the host, and the memory device MD corresponds to the device. The device connected to the information processing apparatus IPD is not limited to the memory device MD.

The memory device MD is a storage in which data can be stored in a non-volatile manner. The memory device MD may be a memory system such as a solid state drive (SSD) including a flash memory, or may be a disk device such as a magnetic disk device. The memory device MD may access a system memory 2 provided in the information processing apparatus IPD via the communication path 100.

The information processing apparatus IPD includes a central processing unit (CPU) 1, the system memory 2, an interface circuit 3, an error notification generation circuit 4, and a system bus 5. The CPU 1 and the system memory 2 are electrically connected to the system bus 5. The interface circuit 3 is electrically connected to the system bus 5 through the error notification generation circuit 4. The error notification generation circuit 4 is an example of a processing circuit or a signal processing circuit.

The system bus 5 transfers data between the respective components connected to the system bus 5. The system bus 5 transfers data in accordance with a predetermined communication protocol. A standard of the communication protocol of the system bus 5 is freely selected. In one example, the system bus 5 conforms to an advanced extensible interface (AXI).

The CPU 1 is a processor that executes various operations in accordance with a computer program.

The system memory 2 provides an area in which a program used by the CPU 1 is loaded, an area in which data used by the CPU 1 is cached or buffered, and the like to the CPU 1. The system memory 2 includes, for example, a random access memory (RAM). The type of the memory constituting the system memory 2 is not limited to the RAM.

In addition, in the system memory 2, an area accessible by the device, in this example, the memory device MD, is allocated. That is, the system memory 2 can be accessed by the CPU 1 and the memory device MD.

In the example shown in FIG. 1, each of a submission queue 21, a completion queue 22, a data memory area 23, and a descriptor memory area 24 is an area accessible by the memory device MD. The CPU 1 can also access these areas.

The submission queue 21 is a storage area having a queue structure. The submission queue 21 may store one or more commands to the memory device MD by the CPU 1. For example, the submission queue 21 may store a write command which is a command for storing data in the memory device MD, or a read command which is a command for reading data from the memory device MD.

The completion queue 22 is a storage area having a queue structure. The completion queue 22 is an area in which the memory device MD stores, when memory the device MD has completed the execution of the command stored in the submission queue 21, a notification of the completion of the execution of the command. One or more notifications of the completion may be stored in the completion queue 22.

The data memory area 23 is a storage area in which various types of data may be stored. The data memory area 23 may store write data, that is, data for which the memory device MD is instructed to write in accordance with the write command, and read data, that is, data read by the memory device MD in response to the read command.

The descriptor memory area 24 is an area in which a descriptor describing a storage position of the write data or the read data in the data memory area 23 is stored.

For example, when writing data into the memory device MD, the following operation is executed. That is, first, the CPU 1 stores the write command in the submission queue 21, stores the write data in the data memory area 23, and stores the descriptor describing the storage position of the write data in the data memory area 23, in the descriptor memory area 24. The memory device MD reads the write command stored in the submission queue 21 and the descriptor stored in the descriptor memory area 24. The memory device MD specifies a storage position of the write data in the data memory area 23 based on the descriptor, and reads the write data from the specified storage position. The memory device MD stores the read write data in a storage medium provided in the memory device MD. When the storage of the write data is completed, the memory device MD stores a notification of the completion of the execution of the write command in the completion queue 22.

In addition, for example, when reading data from the memory device MD, the following operation is executed. That is, first, the CPU 1 stores the read command in the submission queue 21, and stores the descriptor indicating the storage destination position of the read data in the data memory area 23, in the descriptor memory area 24. The memory device MD reads the read command stored in the submission queue 21 and the descriptor stored in the descriptor memory area 24. The memory device MD reads the data instructed by the read command from the storage medium provided in the memory device MD, and stores the data which is read, that is, the read data, into the position of the storage destination in the data memory area 23 indicated by the descriptor. When the storage of the read data is completed, the memory device MD stores a notification of the completion of the execution of the read command in the completion queue 22.

The interface circuit 3 is a functional unit of the information processing apparatus IPD for performing communication with the device via the communication path 100.

The interface circuit 3 includes a link controller 31 and a PHY circuit 32.

The PHY circuit 32 is a circuit that processes electrical signals that are received and transmitted via the communication path 100. For example, the PHY circuit 32 converts a received analog signal into a digital signal and passes the digital signal to the link controller 31, or converts a digital signal output from the link controller 31 into an signal and analog signal via the transmits the communication path 100.

The link controller 31 performs conversion between a communication protocol for communication with the device via the communication path 100 and a communication protocol for communication (hereinafter, referred to as bus access) via the system bus 5. In addition, the link controller 31 may perform scramble processing on the signal transmitted through the communication path 100 or may perform reverse processing of the scramble processing on the signal received through the communication path 100. In addition, the link controller 31 may execute packet analysis on data received through the communication path 100.

The error notification generation circuit 4 generates, when the interface circuit 3 receives a read request from the memory device MD to read data from the system memory 2, an error notification indicating that the data is not output normally even when the system memory 2 normally outputs the data requested by the read request. An operation of generating the error notification even when the system memory 2 normally outputs the data is referred to as an error notification generation operation.

When performing the reading with respect to the system memory 2 provided in the host, the device transmits the read request to the host. The host reads the data stored in the system memory 2 and transmits the data to the device in response to the read request. When the host fails in reading the data from the system memory 2, the host transmits an error response corresponding to the read request to the device.

During manufacturing the memory device, various tests are executed on the memory device. The test on the memory device may include verification of an operation of the memory device when an error response is received.

The error notification generation circuit 4 according to the embodiment generates the error notification even when the data is read normally from the system memory 2 in response to the read request from the memory device MD. In the interface circuit 3, the link controller 31 generates an error response in response to the error notification and transmits the error response to the memory device MD. As a result, it is possible to verify the operation of the memory device MD when the error response is received.

When designing a semiconductor device, previously designed partial circuit data may be diverted in order to reduce a cost or time required for the design. The previously designed partial circuit data is also referred to as an intellectual property core (IP core) and may be commercially available. Modification of the IP core is impossible or requires a great deal of effort.

For the information processing apparatus IPD, the circuit data of the link controller 31 or the circuit data of the interface circuit 3 may be available as the IP core.

In the present embodiment, the error notification generation circuit 4 is disposed outside the interface circuit 3 in order to implement the function of generating the error response without modifying the link controller 31 or the interface circuit 3.

In addition, in the present embodiment, the error notification generation circuit 4 is configured to execute the error notification generation operation when a specific condition is satisfied, and is configured not to execute the error notification generation operation when the specific condition is not satisfied. The specific condition is that a read destination according to the read request includes a previously set specific area among areas of the memory device MD in the system memory 2 that are accessible. Hereinafter, the specific condition for generating the error notification is referred to as an error response condition.

In order to know whether the error response condition is satisfied, the error notification generation circuit 4 monitors a bus access request issued from the link controller 31. When the bus access request is issued from the link controller 31, the error notification generation circuit 4 determines whether the bus access request corresponds to the read request and whether the read destination according to the read request corresponds to the specific area, based on the bus access request. The read destination corresponds to the specific region means that a part or all of the range of the reading is included in the specific area. Hereinafter, the above-described specific area will be referred to as a target area.

A technique to be compared with the embodiment will be described. The technique to be compared with the embodiment is denoted as a comparative example. According to the comparative example, it is determined whether the error response condition is satisfied based on a signal communicated between a PHY circuit and a link controller.

As described above, the signal input to the link controller from the PHY circuit is subjected to various types of processing including the scramble processing. Therefore, in the comparative example, in order to detect the read request or to specify the read destination from the signal communicated between the PHY circuit and the link controller, it is necessary to execute processing equivalent to some processing (for example, scramble processing or packet analysis) executed by the link controller with respect to the signal transmitted from the PHY circuit to the link controller. Therefore, a scale of the circuit for performing the processing equivalent to the error notification generation operation will be increased.

To the contrary, according to the present embodiment, the error notification generation circuit 4 is disposed between the link controller 31 and the system bus 5, and monitors the bus access request issued by the link controller 31. The bus access request issued to the system bus 5 conforms to a communication protocol of the system bus 5 and does not depend on a processing inside the link controller 31. Therefore, unlike the comparative example, the error notification generation circuit 4 may be implemented by a circuit having a simple configuration with a reduced scale.

The error notification generation circuit 4 includes a determination circuit 41, a response detection circuit 42, a replacement circuit 43, and a setting register 44.

The setting register 44 is a register in which information for setting the target area is stored. Various methods may be employed as a method of setting the target area.

In an example, a head address of the target area is set in the setting register 44. In that case, for example, an area having a particular size with a position indicated by the address set in the setting register 44 as a head is regarded as the target area.

In another example, the head address of the target area and the size of the target area are set in the setting register 44.

In still another example, for each of the submission queue 21, the completion queue 22, the data memory area 23, and the descriptor memory area 24, a flag indicating the target area is set in the setting register 44. In that case, among the submission queue 21, the completion queue 22, the data area 23, and the descriptor memory area 24, an area in which a corresponding flag is set in the setting register 44 is regarded as the target area.

In still another example, a flag indicating the target area and an offset amount are set in the setting register 44 for each of the submission queue 21, the completion queue 22, the data area 23, and the descriptor memory area 24. In that case, among the submission queue 21, the completion queue 22, the data memory area 23, and the descriptor memory area 24, an area obtained by offsetting a set offset amount from the head of the area in which a corresponding flag is set in the setting register 44 is regarded as the target area.

In addition to the setting of the target area, any applicable information may be set in the setting register 44. For example, setting information for turning on or off a function of generating the error notification may be set in the setting register 44. When the function of generating the error notification is turned off by the setting information, the error notification generation circuit 4 does not generate the error notification regardless of whether the error response condition is satisfied.

In addition, any area may be set as the target area as long as the area is accessible by the memory device MD. When the memory device MD is accessible to the entire area of the storage area of the system memory 2, the entire area of the storage area of the system memory 2 may be set as the target area.

In addition, the entire area of the area accessible from the memory device MD may be regarded as the target area. In such a case, the storage of the information for setting the target area in the setting register 44 may be omitted.

When the link controller 31 issues the bus access request, the determination circuit 41 determines whether the bus access request is the read request of which read destination includes the target area. That is, the determination circuit 41 determines whether the error notification generation condition is satisfied based on contents of the bus access request.

When the read request is received from the memory device MD, the link controller 31 issues a bus access request conforming to the communication protocol of the system bus 5. The bus access request for the reading includes a read access signal, an address signal, and a size signal (or a burst length signal instead of the size signal). The read access signal is a signal indicating a bus access request for the reading. The address signal is a signal indicating an address of the read destination. The size signal and the burst length signal are signals indicating a range (length) of the reading.

For example, according to the specification of the AXI, an ARVALID signal as the read access signal, an ARADDR signal as the address signal, an ARSIZE signal as the size signal, and an ARLEN signal as the burst length signal are defined. In other communication protocols, a signal group having the same meaning as these signal groups is also defined.

The determination circuit 41 determines whether the bus access request is the read request based on whether the bus access request includes the read access signal. In addition, the determination circuit 41 determines whether the read destination includes the target area based on the setting of the target area stored in the setting register 44, the address signal, and the size signal (or the burst length signal instead of the size signal).

The response detection circuit 42 monitors an output of the read data from the system memory 2 when it is determined that the error notification generation condition is satisfied. When the read data is output from the system memory 2, the response detection circuit 42 issues an instruction to the replacement circuit 43 to generate the error notification.

The system memory 2 outputs various signals including read data in a manner conforming to the communication protocol of the system bus 5 in response to a bus access request that requests the reading. Specifically, the system memory 2 outputs the read data, a read valid signal, and a status signal. The read valid signal is a signal indicating an output period of the read data. The read data is output in synchronization with the read valid signal. The status signal is a signal indicating whether the read data is normally output.

For example, the system memory 2 performs error correction on the read data. When the read data includes no error, the system memory 2 outputs a normal notification indicating that the read data is normally output as the status signal. When the read data includes an error, the system memory 2 outputs an error notification indicating that the read data is not normally output as the status signal. A method of determining whether to output the normal notification or the error notification as the status signal is not limited to this manner.

According to the specification of the AXI, the RVALID signal as the read valid signal and the RRESP signal as the status signal are defined. In other communication protocols, a signal group having the same meaning as these signal groups is also defined.

The response detection circuit 42 detects the output of the read data from the system memory 2 based on the read valid signal. The response detection circuit 42 issues an instruction to the replacement circuit 43 to generate an error notification in response to the output of the read data from the system memory 2.

When the generation of the error notification is instructed, the replacement circuit 43 replaces the content of the status signal from the normal notification to the error notification even when the normal notification is output as the status signal output from the system memory 2. Then, the replacement circuit 43 inputs a status signal indicating the error notification to the link controller 31.

The link controller 31 outputs an error response as a response to the read request to the memory device MD based on the status signal indicating the error notification. The error response is transferred to the memory device MD through the PHY circuit 32 and the communication path 100.

Figure 2:
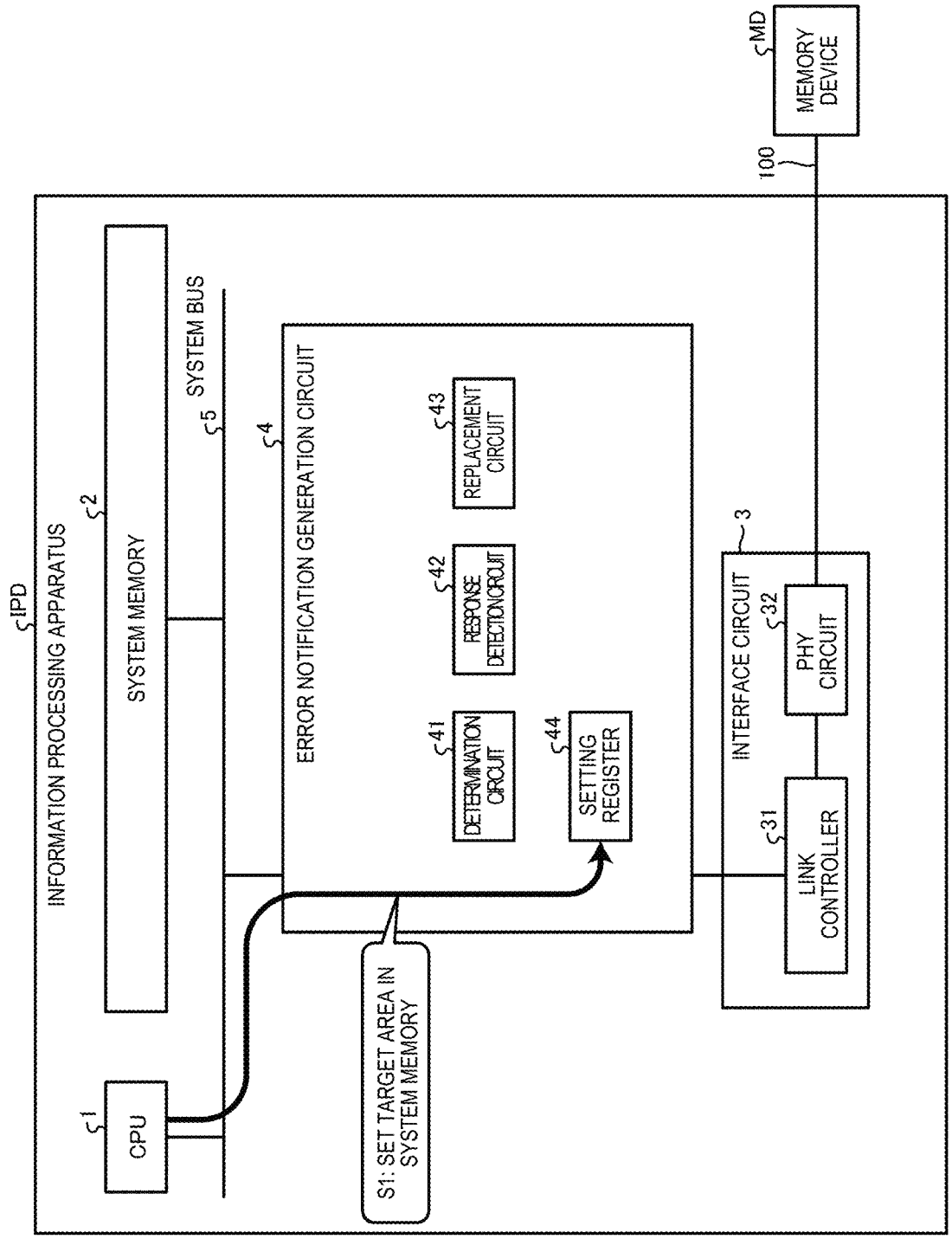
FIG. 2 is a diagram to explain an operation of setting a target area that is executed in the information processing apparatus according to the embodiment.
Figure 3:
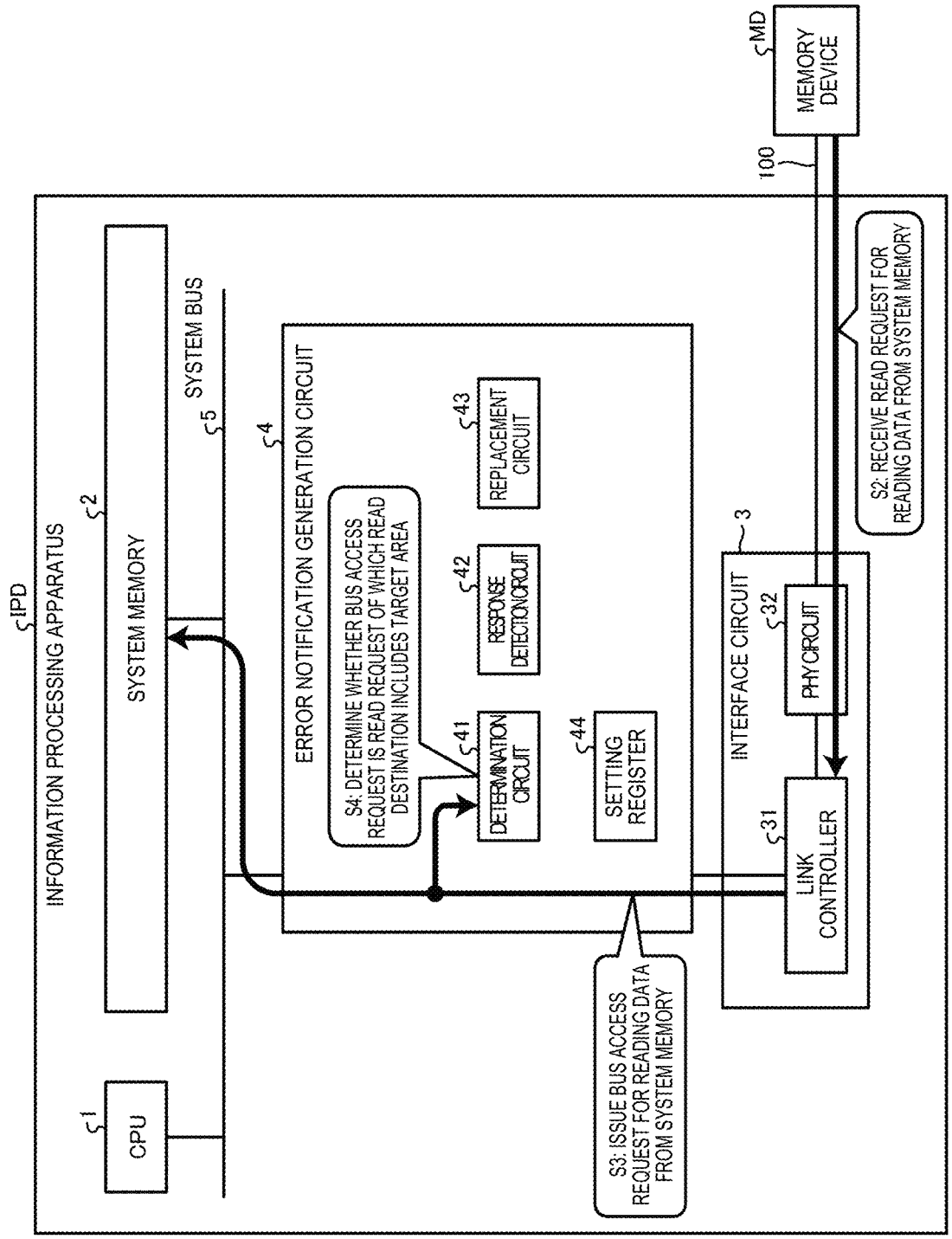
FIG. 3 is a diagram to explain a first half portion of an example of an operation of the information processing apparatus according to the embodiment in response to a read request to read a system memory.
Figure 4:
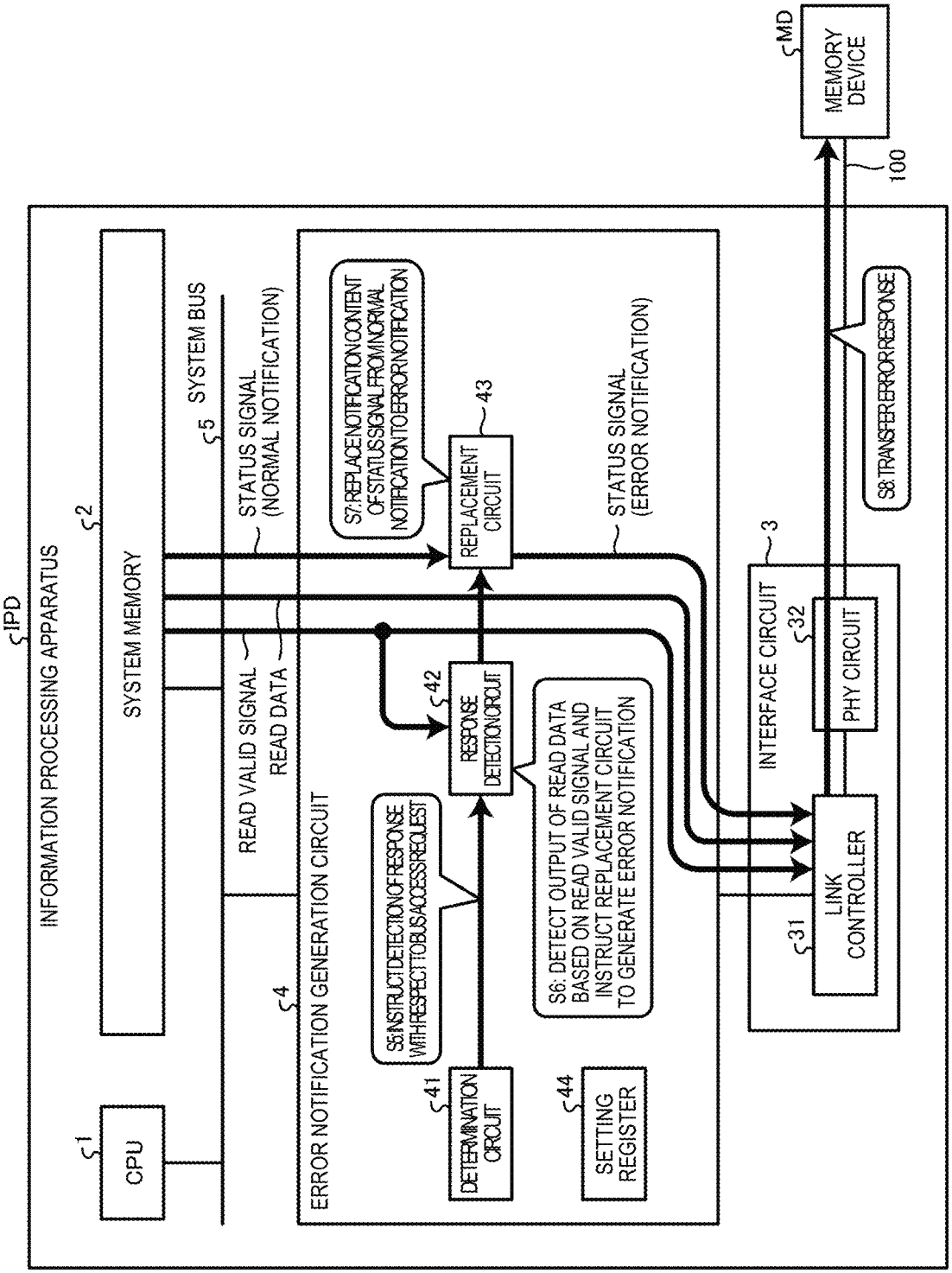
FIG. 4 is a diagram to explain a latter half portion of the example of the operation of the information processing apparatus according to the embodiment in response to the read request to read the system memory.

FIGS. 2 to 4 are diagrams to explain an example of an operation of the information processing apparatus IPD according to the embodiment.

FIG. 2 is a diagram to explain an operation of setting a target area that is executed in the information processing apparatus IPD according to the embodiment. First, the CPU 1 sets the target area in the system memory 2 in the setting register 44 in accordance with a particular computer program (S1). Target area may be set by an address, a size, a flag, or the like as described above.

FIG. 3 is a diagram to explain a first half portion of an example of an operation of the information processing apparatus IPD according to the embodiment in response to a read request to read data from the system memory 2.

When the link controller 31 receives from the memory device MD, the read request to read the data from the system memory 2 (S2), the link controller 31 issues the bus access request to read the data from the system memory 2 (S3). The bus access request is transferred to the system bus 5 through the error notification generation circuit 4, and the system bus 5 transfers the bus access request to the system memory 2.

In the error notification generation circuit 4, the determination circuit 41 determines whether the bus access request transmitted to the system bus 5 is the read request of which read destination includes the target area (S4).

When the bus access request transmitted to the system bus 5 is not the read request of which read destination includes the target area (S4: No), the error notification generation circuit 4 ends the operation without executing the error notification generation operation.

When the bus access request transmitted to the system bus 5 is the read request of which read destination includes the target area (S4: Yes), the determination circuit 41 starts the operation for the error notification generation operation.

FIG. 4 is a diagram to explain a latter half portion of the example of the operation of the information processing apparatus IPD according to the embodiment in response to the read request to read data from the system memory 2, that is, the example of the error notification generation operation.

The determination circuit 41 issues an instruction to the response detection circuit 42 to detect the response to the bus access request (S5).

The system memory 2 reads data from a storage area provided in the system memory 2 in response to the bus access request, and executes error correction or the like. Then, the system memory 2 outputs the read data, the read valid signal, and the status signal. As the status signal, a notification according to a result of error correction or the like of the normal notification or the error notification is output. In the description of FIG. 4, it is assumed that the normal notification is output as the status signal.

When the response detection circuit 42 detects the output of the read data from the system memory 2 based on the read valid signal, the response detection circuit 42 issues an instruction to the replacement circuit 43 to generate the error notification (S6).

The replacement circuit 43 replaces the notification content of the status signal from the normal notification to the error notification in response to the instruction from the response detection circuit 42 (S7).

The link controller 31 receives the read valid signal and the read data, and the status signal in which the notification content is replaced with the error notification by the replacement circuit 43.

When the normal notification is received as the status signal, the link controller 31 transfers the read data to the memory device MD in accordance with the connection standard of the communication path 100 and the communication protocol. However, the link controller 31 receives the error notification as the status signal via the replacement circuit 43. Therefore, the link controller 31 transfers the error response to the memory device MD without transferring the read data based on the error notification (S8). That is, when the error notification is received from the error notification generation circuit 4, the link controller 31 transfers the error response to the memory device MD in response to the read request.

After the processing of S8, an operator of the information processing apparatus IPD may check whether the memory device MD correctly executes the predetermined operation in response to the error response.

In the example shown in FIG. 4, the system memory 2 outputs the normal notification as the status signal. The operation of the error notification generation circuit 4 when the system memory 2 outputs the error notification as the status signal is freely selected.

In the example, the replacement circuit 43 transfers the error notification output as the status signal to the link controller 31 as is. In that case, even when the system memory 2 cannot normally output the read data, the error response is transferred to the memory device MD as a response to the read request. That is, it is possible to verify the operation of the memory device MD according to the error response regardless of whether the system memory 2 normally outputs the read data.

As described above, according to the above embodiment, when the interface circuit 3 receives the read request from the memory device MD to read the data from the system memory 2, the error notification generation circuit 4 generates the error notification even when the system memory 2 normally outputs the read data. The interface circuit 3 outputs an error response as a response corresponding to the read request to the memory device MD based on the error notification.

Therefore, it is possible to verify whether the memory device MD correctly executes the predetermined operation in response to the error response. In addition, since the error notification generation circuit 4 is disposed outside the interface circuit 3, the function of generating the error response is implemented without modifying the interface circuit 3. That is, the information processing apparatus IPD that is able to perform the operation verification of the device without modifying the interface circuit 3 can be obtained.

In addition, according to the above embodiment, the interface circuit 3 is electrically connected to the system bus 5 through the error notification generation circuit 4.

Therefore, the function of generating the error response is implemented without modifying the interface circuit 3.

In addition, according to the above embodiment, when the read request is received from the memory device MD, the interface circuit 3 issues the bus access request to read the data requested by the read request to the system bus 5. The error notification generation circuit 4 determines whether to execute the error notification generation operation based on the bus access request.

The bus access request issued to the system bus 5 conforms to the communication protocol of the system bus 5 and does not depend on the processing inside the link controller 31 or the interface circuit 3. Therefore, unlike the comparative example described above, the error notification generation circuit 4 may be implemented by a circuit having a simple configuration with a reduced scale.

In addition, according to the above embodiment, the error notification generation circuit 4 further includes the setting register 44 in which information for setting a part or all of the storage area of the system memory 2 as the target area is stored. The error notification generation circuit 4 executes the error notification generation operation when the read destination according to the bus access request, that is, the storage position of the read data corresponds to the target area. The error notification generation circuit 4 does not execute the error notification generation operation when the read destination according to the bus access request does not correspond to the target area.

Therefore, it is possible to set the access position for generating the error response.

The method of setting the target area is not limited to a specific method as described above. For example, the submission queue 21, the completion queue 22, the data memory area 23, or the descriptor memory area 24 may be set as the target area. In other words, at least a part of the target area may be set such that the at least a part of the target area is provided in any of the submission queue 21, the completion queue 22, the data memory area 23, or the descriptor memory area 24.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing apparatus comprising:
a processor;
an interface circuit connectable to a device external to the information processing apparatus;
a memory accessible by the processor and accessible by the device via the interface circuit; and
a signal processing circuit disposed in a signal path between the interface circuit and the memory and configured to:
detect output of data read from the memory when the interface circuit receives a read request from the device and causes the memory to perform a read operation in response to the read request; and
generate an error notification even when the memory notifies the signal processing circuit of normal output of the data,
wherein the interface circuit is configured to return, to the device, an error response corresponding to the error notification in response to the read request.

2. The information processing apparatus according to claim 1, wherein the memory is configured to output a status signal indicating whether the output of the data is normally performed.

3. The information processing apparatus according to claim 2, wherein
based on the status signal indicating the normal output of the data, the signal processing circuit is configured to generate a replaced status signal including the error notification and send the replaced status signal to the interface circuit, which then is configured to generate the error response based on the replaced status signal.

4. The information processing apparatus according to claim 1, further comprising:
a bus, wherein
the processor and the memory are electrically connected to the bus, and
the interface circuit is electrically connected to the bus via the signal processing circuit.

5. The information processing apparatus according to claim 4, wherein
the interface circuit is configured to send to the bus a bus access request that causes the memory to perform the read operation, in response to the read request from the device, and
the signal processing circuit is configured to determine whether to perform generation of the error notification based on contents of the bus access request.

6. The information processing apparatus according to claim 5, wherein
the contents of the bus access request indicate a range of a memory region of the memory with respect to which the read operation is to be performed, and the signal processing circuit is configured to determine to perform the generation of the error notification when the indicated range includes a target region.

7. The information processing apparatus according to claim 6, wherein the signal processing circuit includes a register in which the target region is stored.

8. The information processing apparatus according to claim 6, wherein the signal processing circuit is configured to determine to not perform the generation of the error notification when the indicated range does not include the target region.

9. The information processing apparatus according to claim 8, wherein the signal processing circuit is configured to transfer a status signal generated by the memory that indicates normal output of the data when determining to not perform the generation of the error notification.

10. The information processing apparatus according to claim 6, wherein
the memory includes:
a first area in which a command to the device is stored,
a second area in which a completion notification of an operation corresponding to the command by the device is stored,
a third area in which write data to be written into the device or read data that is read from the device is stored, and
a fourth area in which a description of a storage position of the write data or the read data in the third area is stored, and
at least a part of the target area is included in one or more of the first area, the second area, the third area, or the fourth area.

11. A method of controlling an information processing apparatus including a processor, an interface circuit connectable to a device external to the information processing apparatus, and a memory accessible by the processor and accessible by the device via the interface circuit, the method comprising:
detecting output of data read from the memory when the interface circuit receives a read request from the device and causes the memory to perform a read operation in response to the read request;
generating an error notification when the memory notifies of normal output of the data; and
returning, from the interface circuit to the device, an error response corresponding to the error notification in response to the read request.

12. The method according to claim 11, further comprising:
outputting, from the memory, a status signal indicating whether the output of the data is normally performed.

13. The method according to claim 12, further comprising:
based on the status signal indicating the normal output of the data, generating a replaced status signal including the error notification and sending the replaced status signal to the interface circuit, by which the error response is generated based on the replaced status signal.

14. The method according to claim 11, wherein
the information processing apparatus further includes a bus,
the processor and the memory are electrically connected to the bus, and
the interface circuit is electrically connected to the bus via a signal processing circuit by which said detecting output of data and said generating an error notification are performed.

15. The method according to claim 14, further comprising:
sending from the signal processing circuit to the bus a bus access request that causes the memory to perform the read operation, in response to the read request from the device, and
determining whether to perform generation of the error notification based on contents of the bus access request.

16. The method according to claim 15, wherein
the contents of the bus access request indicate a range of a memory region of the memory with respect to which the read operation is to be performed, and
it is determined to perform the generation of the error notification when the indicated range includes a target region.

17. The method according to claim 16, wherein the signal processing circuit includes a register in which the target region is stored.

18. The method according to claim 16, wherein it is determined to not perform the generation of the error notification when the indicated range does not include the target region.

19. The method according to claim 18, further comprising:
transferring a status signal generated by the memory that indicates normal output of the data when determining to not perform the generation of the error notification.

20. The method according to claim 16, wherein
the memory includes:
a first area in which a command to the device is stored,
a second area in which a completion notification of an operation corresponding to the command by the device is stored,
a third area in which write data to be written into the device or read data that is read from the device is stored, and
a fourth area in which a description of a storage position of the write data or the read data in the third area is stored, and
at least a part of the target area is included in one or more of the first area, the second area, the third area, or the fourth area.

* * * * *